No. 670,775. Patented Mar. 26, 1901.
G. W. GESNER.
PROCESS OF MAKING ALLOYS OF IRON AND HYDROGEN.
(Application filed Dec. 15, 1899.)
(No Model.)

FLAKES

FLAKE-ENLARGED SECTION.

WITNESSES:
A. Roy Appleman
J. B. Clauntice

INVENTOR
Geo. W. Gesner
BY
Thomas Drew Stetson
ATTORNEY.

THE NORRIS PETERS CO., PHOTO-LITHO., WASHINGTON, D. C.

UNITED STATES PATENT OFFICE.

GEORGE WELTDEN GESNER, OF BROOKLYN, NEW YORK, ASSIGNOR TO HARLESTON CORBETT GESNER, OF SAME PLACE.

PROCESS OF MAKING ALLOYS OF IRON AND HYDROGEN.

SPECIFICATION forming part of Letters Patent No. 670,775, dated March 26, 1901.

Application filed December 15, 1899. Serial No. 740,415. (No specimens.)

*To all whom it may concern:*

Be it known that I, GEORGE WELTDEN GESNER, a citizen of the United States, and a resident of the borough of Brooklyn, in the city and State of New York, have invented an Improved Process of Making an Alloy of Iron and Hydrogen, of which the following is a specification.

The improvement is based on that set forth in an application for United States Patent by me filed March 10, 1896, Serial No. 582,600. That application described the product of a valuable alloy of iron and hydrogen in the form of scales or flakes adhering slightly to the surface of the remainder of the iron. The theory of that case is that the absorption of the hydrogen by the iron is in something like definite proportions and commences at the surface and proceeds inward, there being as this work progresses always a limit where the relatively soft layers of flakes terminate and the unalloyed iron is met. I have discovered that through absence of a sharply-defined boundary or other cause some or all the flakes are liable to take away and retain with the alloy iron unalloyed or only partially alloyed. This invention provides for the further treatment of the flakes to reduce the whole to the desired completely-alloyed condition. My experiments indicate that the completely-alloyed iron is in this mode of the manufacture and at this stage of the treatment far more friable than the iron which is less thoroughly alloyed. I crush or grind all the material which is in the fully-friable condition and leave unaffected or less perfectly pulverized the iron which remains unalloyed or less completely alloyed. Then by simply screening the powder is allowed to fall into a suitable bin for subsequent melting or forging, and the tougher material arrested by the screen, in the form of plates or strings of various irregular forms, according to kind and severity of the grinding treatment, is kept out and may be thrown away or be subject to further treatment, as shall be found expedient.

The accompanying drawings form a part of this specification and represent good means of carrying out the invention.

Figure 1:
Figure 2:
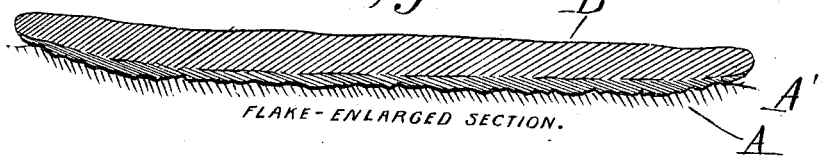
Figure 3:
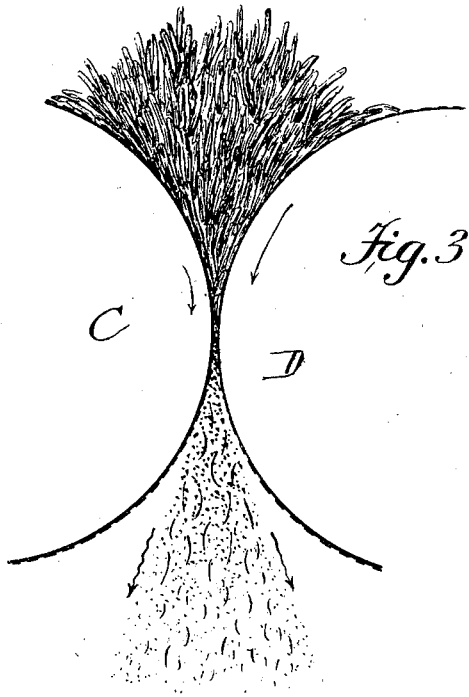
Figure 4:
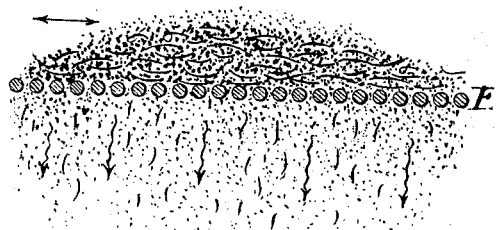

Figure 1 is a vertical section showing a quantity of the flakes as they come from the iron. Fig. 2 is on a larger scale. It shows a similar section through one of the flakes alone. The hatching or section shading shows the main body perfectly alloyed and pulverizable, but one face, the lower face, as shown, imperfectly alloyed; and Fig. 3 is on the same scale as Fig. 1. It is a vertical section of the meeting surfaces of two crushing and grinding rolls with the flakes being passed down between and crushed; and Fig. 4 is a vertical section through a portion of the screen with the crushed stock being treated thereby.

Similar letters of reference indicate like parts in all the figures where they appear.

A indicates the unalloyed iron which remains after the scale is detached.

B is the completely-alloyed iron in the relatively soft and friable condition which it assumes during the formation of the flakes, and A' indicates a thin and usually irregular stratum of unalloyed or imperfectly-alloyed iron which comes off with the scale or flake when it is detached from the mass of metal within the furnace. The unalloyed iron A' remains as a part of the flakes B. The process down to this stage may be in all respects the same as is set forth in a patent already issued to me as a division of my previous application above referred to, such division being dated January 30, 1900, No. 640,320, and may be varied in many ways so long as the flakes or analogous weak condition of the alloy is temporarily induced, with a liability to hold more or less unalloyed, and consequently tougher, iron mingled therewith. I take this mingled material in any regular or irregular forms, which for brevity I will term "flakes" and which for convenience I have represented by nearly uniform thin and slightly-bent pieces, and subject the whole to a crushing action between two rolls C D, driven in opposite directions by powerful machinery, one working faster than the other, so as to mingle a grinding with a directly-compressing effect. The rolls should have means not only for revolving and for holding them strongly against separation, but should also have means for adjusting their extent of separation, which may be similar to the provisions in the treatment of wheat in roller-milling. The rolls are grooved longitudinally to assure a better hold on the flakes and compel their passage down through the narrow space to be disintegrated. The material thus prepared is next screened by treatment in a revolving or otherwise-moved screen. I will represent this as effected by a plane horizontal screen of wire-cloth E, subjected to a reciprocating motion, which may be induced by ordinary mechanism, as a connection to a revolving crank, as commonly practiced in winnowing-machines. The fine material B, comprising the fully-alloyed portions of the several flakes reduced to powder, falls through the uniform meshes of the screen and is collected below to be subsequently melted and poured to form castings of my pure alloy, or this powder may be rolled or forged, or both, at a welding heat to form sheets or forgings of my pure alloy. The coarser material, which is arrested by the screen and is removed either constantly or at intervals as tailings, is composed mainly or entirely of partially-alloyed iron and may be utilized by being again heated and exposed to hydrogen or may be melted to form articles in which only a lower percentage of hydrogen than the full proper alloy may suffice. This material may in some cases be rejected as waste.

Modifications may be made without departing from the principle or sacrificing the advantages of the invention. The reduction of the scales to powder and to strings, according to its degree of absorption of the hydrogen, may be effected by other forms of grinding and crushing apparatus than the rolls. Other forms of partially-alloyed iron than the scales shown may be treated. If we cause hydrogen gas to rise through melted iron, it is liable to be irregularly absorbed, so that while some portions form the full alloy in a friable condition other portions form the alloy in a tough condition, or are not alloyed sufficiently to be taken out of the original strong and tough condition of unalloyed iron; or the alloy may be made without uniformity by sending up hydrogen irregularly in the reduction of iron from ore in a blast-furnace or other apparatus. Such heterogeneous material, however made, may be ground by any efficient apparatus, as a stamping-mill, and the friable portions similarly separated in the form of powder by screening and separately melted or welded together to form the desired alloy, allowing the tougher material arrested by the screen to be differently treated.

I claim as my invention—

1. The within-described process of securing a thoroughly-alloyed product of iron and hydrogen, the same consisting in subjecting heated iron to the action of hydrogen gas to produce an alloy of iron and hydrogen, subjecting such alloy to mechanical reduction and separating the unalloyed metal particles from the finely-pulverized alloy element, substantially as herein specified.

2. The within-described process of securing a thoroughly-alloyed product of iron and hydrogen, the same consisting in subjecting extended surfaces of heated iron to hydrogen gas to produce an alloy in the form of scales, removing the latter and subjecting them to mechanical reduction and separating the unalloyed metal particles from the finely-reduced alloy element, substantially as herein specified.

3. The within-described process of securing a thoroughly-alloyed product of iron and hydrogen, the same consisting in subjecting extended surfaces of heated iron to hydrogen gas to produce an alloy in the form of scales, removing the latter and mechanically reducing them to detach the alloyed from the unalloyed portions, subjecting the material to a screening operation to remove the unalloyed metal, and fusing the alloyed powder to convert it to homogeneous form, substantially as herein specified.

In testimony that I claim the invention above set forth I affix my signature in the presence of two witnesses.

GEORGE WELTDEN GESNER.

Witnesses:
WM. H. MCGRANN,
M. O'DONNOGHUE.